US012703060B2

(12) United States Patent
Kim et al.

(10) Patent No.: US 12,703,060 B2
(45) Date of Patent: Aug. 11, 2026

(54) ENVIRONMENT-FRIENDLY POLISHING DISC AND PROCESSING TECHNOLOGY THEREOF

(71) Applicant: Iuen-Chun Kim, Jinhua (CN)

(72) Inventors: Iuen-Chun Kim, Jinhua (CN); Yi Jin, Jinhua (CN)

( * ) Notice: Subject to any disclaimer, the term of this patent is extended or adjusted under 35 U.S.C. 154(b) by 1235 days.

(21) Appl. No.: 17/536,134

(22) Filed: Nov. 29, 2021

(65) Prior Publication Data

US 2022/0219286 A1 Jul. 14, 2022

(30) Foreign Application Priority Data

Jan. 12, 2021 (CN) ........................ 202110038986.1

(51) Int. Cl.

| | |
|---|---|
| ***B24B 37/24*** | (2012.01) |
| ***B29C 39/00*** | (2006.01) |
| ***B29C 39/10*** | (2006.01) |
| ***B29C 39/26*** | (2006.01) |
| ***B29C 39/38*** | (2006.01) |
| ***B29K 67/00*** | (2006.01) |

(Continued)

(52) U.S. Cl.

CPC ............ *B24B 37/24* (2013.01); *B29C 39/003* (2013.01); *B29C 39/10* (2013.01); *B29C 39/26* (2013.01); *B29C 39/38* (2013.01); *B29K 2067/00* (2013.01); *B29K 2105/16* (2013.01); *B29K 2667/00* (2013.01); *B29L 2031/736* (2013.01)

(58) Field of Classification Search

CPC ......... B24B 37/20; B24B 37/22; B24B 37/24; B24D 11/02; B24D 11/00; B24D 11/001; B24D 9/085

See application file for complete search history.

(56) References Cited

U.S. PATENT DOCUMENTS 2,542,058 A * 2/1951 Riedesel ................ B24D 11/00 15/104.94
3,875,703 A * 4/1975 Clemente ............... B24D 11/00 451/538

(Continued)

FOREIGN PATENT DOCUMENTS

CN 205660549 U 10/2016
CN 108777155 A 11/2018

(Continued)

*Primary Examiner* — Joel D Crandall
(74) *Attorney, Agent, or Firm* — Nitin Kaushik

(57) ABSTRACT

An environment-friendly polishing disc and a processing technology thereof are provided by the present disclosure, and the present disclosure is related to the field of industrial electronic technology. The environment-friendly polishing disc, comprising a lower backsheet, a soft polishing layer on an upper side of the lower backsheet, and the soft polishing layer is a polyurethane synthetic resin containing polishing powder, and an upper backsheet is provided on an upper side of the soft polishing layer, so as to solve the problems of high cost, low polishing efficiency and serious environmental pollution in the long-term polishing process of existing polishing disc. In addition, the disclosure also proposes a processing technology of an environment-friendly polishing disc, which includes: preparing processing tools, producing the upper backsheet, producing the lower backsheet and batching of a soft polishing layer and forming of the polishing disc.

7 Claims, 1 Drawing Sheet

(51) Int. Cl.

| | |
|---|---|
| ***B29K 105/16*** | (2006.01) |
| ***B29K 667/00*** | (2006.01) |
| ***B29L 31/00*** | (2006.01) |

(56) References Cited

U.S. PATENT DOCUMENTS

| | | | | |
|---|---|---|---|---|
| 4,490,948 | A * | 1/1985 | Hanstein | B24D 13/14 451/60 |
| 5,482,756 | A * | 1/1996 | Berger | B24D 11/006 428/36.1 |
| 6,077,601 | A * | 6/2000 | DeVoe | B24D 18/00 428/323 |
| 2004/0166788 | A1 * | 8/2004 | Travis | B24B 23/02 451/359 |
| 2005/0118933 | A1 * | 6/2005 | Sakai | B24B 37/042 451/41 |
| 2012/0309273 | A1 * | 12/2012 | Popov | B24D 15/023 451/523 |

FOREIGN PATENT DOCUMENTS

| | | | |
|---|---|---|---|
| CN | 109086249 | A | 12/2018 |
| CN | 109273035 | A | 1/2019 |
| CN | 208507187 | U | 2/2019 |
| CN | 208547942 | U | 2/2019 |
| CN | 109500716 | A | 3/2019 |
| CN | 208569628 | U | 3/2019 |
| CN | 212825549 | U | 3/2021 |

* cited by examiner

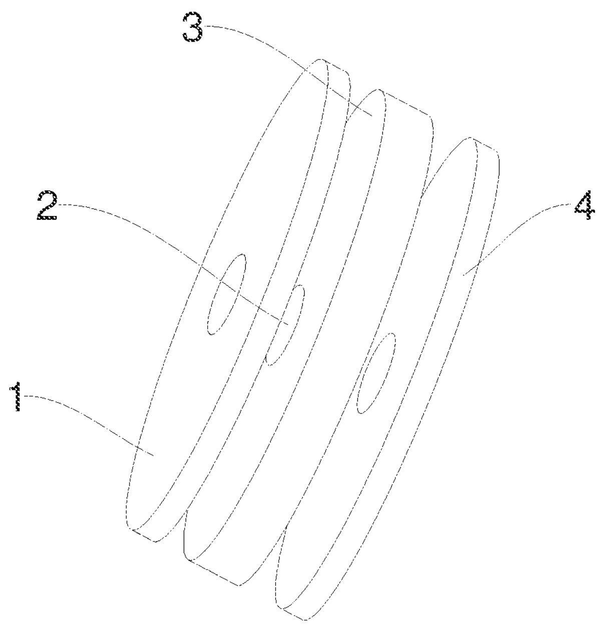
3
2
4
1

ENVIRONMENT-FRIENDLY POLISHING DISC AND PROCESSING TECHNOLOGY THEREOF

TECHNICAL FIELD

The present disclosure relates to the technical field of industrial electronics, in particular to an environment-friendly polishing disc and a processing technology thereof.

BACKGROUND

Panels that use glass or sapphire to make electronic products, such as mobile phones, tablets, watches, and so on, are increasingly used in modern society. But because of the characteristics of glass or sapphire itself, it is very easy to produce scratch in the process of production or use. If the scratch can not be repaired after it is produced, it will bring great enterprise. In the prior art, the electronic product surface glass or sapphire panel is repaired by polishing the optical disc.

There are two kinds of disc polishing, one is a single soft polishing material, such as leather, wool, etc. This kind of polishing disc is soft in texture and uneven in force during polishing, which is easy to cause the bevel around the edge of the workpiece after polishing, with low accuracy, poor tensile strength of the material itself, low rotating speed and low working efficiency, and short service life. The other kind is metal polishing disc, but the hardness of metal polishing disc is high, and the requirements for machining workpiece are many, and the suitable surface is narrow. Moreover, the polishing operation of the above two types of polishing discs requires the addition of polishing powder and polishing liquid at regular intervals and the circular polishing in water. In the long-term polishing process, there are problems of high cost, low polishing efficiency and serious environmental pollution.

To sum up, we put forward a kind of environmental quality disc to solve the above problems.

SUMMARY

The present disclosure aims to provide an environment-friendly polishing disc, which solves the problems of high cost, low polishing efficiency and serious environmental pollution in a long-term polishing process of a conventional polishing disc.

Another object of the present disclosure is to provide a processing technology of an environment-friendly polishing disc, which can realize stable processing of an environment-friendly soft polishing layer.

Embodiments of the present disclosure are realized as follows:

in a first aspect, the present disclosure provides an environment-friendly polishing disc, comprising a lower backsheet, a soft polishing layer on an upper side of the lower backsheet, and the soft polishing layer is a polyurethane synthetic resin containing polishing powder, and an upper backsheet is provided on an upper side of the soft polishing layer.

In some embodiments of the disclosure, the lower backsheet is a magic paste.

In some embodiments of the disclosure, the upper backsheet is a polyester fiber sheet.

In some embodiments of the disclosure, the polyurethane synthetic resin comprises HC8968 and HC8552.

In some embodiments of the disclosure, the polishing powder is one of rare earth polishing powder, optical polishing powder or touch screen polishing powder.

In some embodiments of the disclosure, the lower backsheet, the soft polishing layer and the upper backsheet are all circular, and the diameters of the lower backsheet, the soft polishing layer and the upper backsheet are all same.

In some embodiments of the disclosure, a notch is provided in a middle of the soft polishing layer, and an upper side of the notch and a lower side of the notch penetrate an upper side of the upper backsheet and a lower side of the lower backsheet, respectively.

In a second respect, a processing technology of the environment-friendly polishing disc, wherein: comprising following steps:

- preparing processing tools: a table, a drying box, scissors, the magic paste, the polyester fiber sheet, an upper mold, a lower mold, the polishing powder, a dispensing barrel, the polyester synthetic resin containing HC8968 and HC8552;
- producing the upper backsheet: laying the polyester fiber sheet on the table, placing the lower mold on an upper side of the polyester fiber sheet, and cutting out the upper backsheet with a same profile as the lower mold along a side of the lower mold;
- producing the lower backsheet: laying the magic paste on the table, placing the lower mold on an upper side of the magic paste, cutting out the lower backsheet with the same profile as the lower mold along the side of the lower mold, and making a formed lower backsheet fixedly connected with the lower mold;
- batching of the soft polishing layer: adding the polishing powder and the polyester synthetic resin containing HC8968 and HC8552 into the batching barrel, and uniformly mixing the polishing powder and the polyester synthetic resin containing HC8968 and HC8552 with a vibrator; and
- forming of the polishing disc: pouring mixed raw materials in the batching barrel into the lower mold on the upper side of the lower backsheet, scraping a surface of the mixed raw materials on an inner side of the lower mold, fixing the upper backsheet on an upper side of the lower mold, setting the upper mold on the upper side of the upper backsheet, and making the upper mold fixedly connected with the lower mold, and transporting an entirety of the lower backsheet, the lower mold, the polyester fiber sheet and the upper mold to the drying box for drying and forming, after drying in the drying box, removing the upper mold and the lower mold to form the polishing disc.

In some embodiments of the disclosure, the lower mold comprises a circular ring member and a disc, a diameter of the disc is smaller than an inner diameter of the circular ring member, the disc is located in a middle of the circular ring member, and the upper mold is a circular plate.

In some embodiments of the disclosure, the lower backsheet, the lower mold, the polyester fiber sheet and the upper mold are integrally composed of three sequential drying steps in a drying oven, wherein temperatures of the three drying steps are 45° C., 92° C. and 60° C. respectively, and times of the three drying steps are 230 minutes, 230 minutes and 450 minutes respectively.

Compared with the prior art, embodiments of the present disclosure have at least the following advantages or beneficial effects:

In the first aspect, the present disclosure provides an environment-friendly polishing disc, comprising a lower backsheet, a soft polishing layer on an upper side of the lower backsheet, and the soft polishing layer is a polyurethane synthetic resin containing polishing powder, and an upper backsheet is provided on an upper side of the soft polishing layer.

According to the first aspect, in the polishing process of the polishing disc in the present application, the polishing disc is put into tap water for processing of industrial electronic products (glass or sapphire, etc.), and the soft polishing layer interacts with the industrial electronic products. On the one hand, since the soft polishing layer contains polishing powder, no polishing powder is needed, the polishing process steps are reduced, and the efficiency is improved in the polishing process; on the other hand, the soft polishing layer is made of polyurethane synthetic resin, so that the formed polishing disc is a soft polishing disc, which has the characteristics of slow elasticity, no deep defects, and the bonding agent is soft and elastic, so that a uniform refractive index of the junction surface can be obtained on one side of the polishing surface to achieve the mirror optical effect, and the force on the industrial electronic products is more gentle, so that the use of polishing liquid can be reduced, the force on the industrial electronic products can be reduced, and the polishing finish and polishing efficiency can be further improved. In that above polishing process, the use of polishing powder and polishing liquid is reduced, the pollution to the environment is reduced, and the rare earth powder special synthetic resin combination can its wear resistance and grinding force, and the polishing sheet structure can quickly remove the debris due to the existence of the special groove strip, so as to avoid packing and heating, and is suitable for long-term polishing. The disclosure solves the problems of high cost, low polishing efficiency and serious environmental pollution in the long-term polishing process of the existing polishing disc.

In the second aspect, a processing technology of the environment-friendly polishing disc, wherein: comprising following steps:

- preparing processing tools: a table, a drying box, scissors, the magic paste, the polyester fiber sheet, an upper mold, a lower mold, the polishing powder, a dispensing barrel, the polyester synthetic resin containing HC8968 and HC8552;
- producing the upper backsheet: laying the polyester fiber sheet on the table, placing the lower mold on an upper side of the polyester fiber sheet, and cutting out the upper backsheet with a same profile as the lower mold along a side of the lower mold;
- producing the lower backsheet: laying the magic paste on the table, placing the lower mold on an upper side of the magic paste, cutting out the lower backsheet with the same profile as the lower mold along the side of the lower mold, and making a formed lower backsheet fixedly connected with the lower mold;
- batching of the soft polishing layer: adding the polishing powder and the polyester synthetic resin containing HC8968 and HC8552 into the batching barrel, and uniformly mixing the polishing powder and the polyester synthetic resin containing HC8968 and HC8552 with a vibrator; and
- forming of the polishing disc: pouring mixed raw materials in the batching barrel into the lower mold on the upper side of the lower backsheet, scraping a surface of the mixed raw materials on an inner side of the lower mold, fixing the upper backsheet on an upper side of the lower mold, setting the upper mold on the upper side of the upper backsheet, and making the upper mold fixedly connected with the lower mold, and transporting an entirety of the lower backsheet, the lower mold, the polyester fiber sheet and the upper mold to the drying box for drying and forming, after drying in the drying box, removing the upper mold and the lower mold to form the polishing disc.

For the second aspect, the upper backsheet and the lower backsheet all have the same contour as the lower mold, so that the polishing formed in the later processing is more symmetrical in appearance. The vibrator can realize the uniform mixing of polishing powder and polyester synthetic resin containing HC8968 and HC8552, so that the density of the formed soft polishing layer is more uniform, and the surface of the mixed raw material is scraped to make the surface of the soft polishing layer smoother. The design of the disclosure can realize the stable processing of the friendly soft polishing layer.

BRIEF DESCRIPTION OF DRAWINGS

In order to more clearly illustrate the technical solution of the embodiments of the present disclosure, the following will briefly introduce the drawing to be used in the embodiments. It should be understood that the following drawing only show some embodiments of the present disclosure, and therefore should not be regarded as a limitation of the scope. For those of ordinary skill in the art, other relevant drawing can be obtained from these drawing without paying creative work.

The drawing is a structural diagram of an environment-friendly polishing disc according to an embodiment of the present disclosure.

DETAILED DESCRIPTION OF THE EMBODIMENTS

In order to make the object, technical scheme and advantages of the embodiments of the present disclosure clearer, the technical scheme in the embodiments of the present disclosure will be described clearly and completely in combination with the drawing of the embodiments of the present disclosure. It is obvious that the described embodiments are part of the embodiments of the present disclosure, but not all of the embodiments. The components of embodiments of the present disclosure, generally described and shown in the drawing herein, may be arranged and designed in a variety of different configurations.

Therefore, the following detailed description of the embodiments of the disclosure provided in the drawing is not intended to limit the scope of the claimed disclosure, but merely represents selected embodiments of the disclosure. Based on the embodiments of the present disclosure, all other embodiments obtained by those of ordinary skill in the art without performing creative work are within the scope of the present disclosure.

It should be noted that similar numerals and letters denote similar terms in the following figures, so that once a term is defined in one drawing, it need not be further defined and explained in the following drawing.

In the description of the embodiments of the present disclosure, it should be noted that if the directions or positional relationships indicated by the terms “center”, “upper”, “lower”, “left”, “right”, “vertical”, “horizontal”, “inner”, “outer” or the like are based on the directions or positional relationships shown in the drawing, or the directions or positional relationships which are normally placed when the product of the present disclosure is used, it is only for the convenience of describing the present disclosure and simplifying the description, and is not intended to indicate or imply that the referred device or element must have a specific orientation, be constructed and operate in a specific orientation, and therefore can not be understood as a limitation of the present disclosure.

In addition, the appearance of the terms "horizontal", "vertical", "overhang", etc. does not mean that the component is required to be absolutely horizontal or overhang, but may be slightly tilted. For example, "horizontal" only means that its direction is more horizontal than "vertical", which does not mean that the structure must be completely horizontal, but can be slightly inclined.

In the description of the embodiments of the present disclosure, it should also be noted that, unless otherwise expressly specified and limited, the terms "setting", "installation", "connection" and "connection" should be understood in a broad sense, for example, it may be a fixed connection, a removable connection, or an integral connection; it may be a mechanical connection, or an electrical connection; it may be a direct connection, or an indirect connection through an intermediate medium, or a connection between two elements. For those of ordinary skill in the art, the specific meaning of the above term in the present disclosure can be understood according to specific circumstances.

Embodiment 1

Referring to the drawing, an environment-friendly polishing disc, comprising a lower backsheet 4, a soft polishing layer 3 on an upper side of the lower backsheet 4, and the soft polishing layer 3 is a polyurethane synthetic resin containing polishing powder, and an upper backsheet 1 is provided on an upper side of the soft polishing layer 4.

Principles of the disclosure: in the polishing process of the polishing disc in the present application, the polishing disc is put into tap water for processing of industrial electronic products (glass or sapphire, etc.), and the soft polishing layer 3 interacts with the industrial electronic products. On the one hand, since the soft polishing layer 3 contains polishing powder, no polishing powder is needed, the polishing process steps are reduced, and the efficiency is improved in the polishing process; on the other hand, the soft polishing layer 3 is made of polyurethane synthetic resin, so that the formed polishing disc is a soft polishing disc, which has the characteristics of slow elasticity, no deep defects, and the bonding agent is soft and elastic, so that a uniform refractive index of the junction surface can be obtained on one side of the polishing surface to achieve the mirror optical effect, and the force on the industrial electronic products is more gentle, so that the use of polishing liquid can be reduced, the force on the industrial electronic products can be reduced, and the polishing finish and polishing efficiency can be further improved. In that above polishing process, the use of polishing powder and polishing liquid is reduced, the pollution to the environment is reduced, and the rare earth powder special synthetic resin combination can its wear resistance and grinding force, and the polishing sheet structure can quickly remove the debris due to the existence of the special groove strip, so as to avoid packing and heating, and is suitable for long-term polishing. The disclosure solves the problems of high cost, low polishing efficiency and serious environmental pollution in the long-term polishing process of the existing polishing disc.

In some embodiments of the disclosure, the lower backsheet is a magic paste 4.

In the above embodiment, the lower backsheet 4, which is the soft polishing layer 3, on the one hand has a supporting effect on the soft polishing layer 3, and on the other hand can realize the fast connection between the polishing disc and the external equipment. It should be noted here that the lower backsheet 4 is only one embodiment of the present embodiment and is not limited to the structure of the lower backsheet 4, and the lower backsheet 4 having other structures capable of achieving the above purpose can be applied here.

In some embodiments of the disclosure, the upper backsheet 1 is a polyester fiber sheet.

In the above embodiment, polyester fibers, commonly known as "polyester". It is a kind of PET fiber, which is a kind of polymer compound. The polyester fiber sheet serves as the upper backsheet 1 and has a covering and protecting effect on the soft polishing layer 3.

In some embodiments of the disclosure, the polyurethane synthetic resin comprises HC8968 and HC8552.

In the above embodiment, the polyurethane synthetic resin is mainly prepare by mixing HC8968 and HC8552, and the polyurethane synthetic resin has slow elasticity and can obtain a uniform refractive index of the junction surface on a polished single side to achieve a mirror optical effect. Polyurethane synthetic resin has strong wear resistance and grinding force.

In some embodiments of the disclosure, the polishing powder is one of rare earth polishing powder, optical polishing powder or touch screen polishing powder.

In the above embodiment, the polishing powder is generally composed of cerium oxide, aluminum oxide, silicon oxide, iron oxide, zirconium oxide, chromium oxide and the like. The hardness of different materials is different, and the chemical properties in water are different, so the application is different. Usually, cerium oxide polishing powder is used for polishing glass and silicon-containing materials, aluminum oxide polishing powder is used for polishing stainless steel, and iron oxide can also be used for glass, but the speed is slow, which is usually used for polishing soft materials. Tin oxide is often used for stone polishing and chromium oxide is often used for ceramic tile polishing. For different industrial electronic processing, different kinds of polishing powder can be selected, such as rare earth polishing powder, optical polishing powder or touch screen polishing powder.

In some embodiments of the disclosure, the lower backsheet 4, the soft polishing layer 3 and the upper backsheet 1 are all circular, and the diameters of the lower backsheet 4, the soft polishing layer 3 and the upper backsheet 1 are all same.

In the above embodiment, the polishing disc composed of the lower backsheet 4, the soft polishing layer 3 and the upper backsheet 1 has a more regular appearance, and the formed polishing disc has a more beautiful appearance. In the manufacturing process of the soft polishing disc, the soft polishing layer 3 is formed by casting, and the lower backsheet 4 and the upper backsheet 1 have better sealing properties to the raw materials of the soft polishing layer 3.

In some embodiments of the disclosure, a notch 2 is provided in a middle of the soft polishing layer 3, and an upper side of the notch 2 and a lower side of the notch penetrate an upper side of the upper backsheet 1 and a lower side of the lower backsheet 4, respectively.

In the above embodiment, the aperture of the notch 2 on the soft polishing layer 3 is small, and the notch 2 is provided on the polishing disc, so that the connection is convenient when the polishing disc is mounted. The shape of the notch 2 is designed to be circular, so that the stress in each position of the soft polishing layer 3 is more uniform after the polishing disc is installed.

Embodiment 2

A processing technology of the environment-friendly polishing disc, comprising following steps:

preparing processing tools: a table, a drying box, scissors, the magic paste, the polyester fiber sheet, an upper mold, a lower mold, the polishing powder, a dispensing barrel, the polyester synthetic resin containing HC8968 and HC8552;

producing the upper backsheet 1: laying the polyester fiber sheet on the table, placing the lower mold on an upper side of the polyester fiber sheet, and cutting out the upper backsheet 1 with a same profile as the lower mold along a side of the lower mold;

producing the lower backsheet 4: laying the magic paste on the table, placing the lower mold on an upper side of the magic paste, cutting out the lower backsheet 4 with the same profile as the lower mold along the side of the lower mold, and making a formed lower backsheet 4 fixedly connected with the lower mold;

batching of the soft polishing layer 3: adding the polishing powder and the polyester synthetic resin containing HC8968 and HC8552 into the batching barrel, and uniformly mixing the polishing powder and the polyester synthetic resin containing HC8968 and HC8552 with a vibrator; and forming of the polishing disc: pouring mixed raw materials in the batching barrel into the lower mold on the upper side of the lower backsheet 4, scraping a surface of the mixed raw materials on an inner side of the lower mold, fixing the upper backsheet 1 on an upper side of the lower mold, setting the upper mold on the upper side of the upper backsheet 1, and making the upper mold fixedly connected with the lower mold, and transporting an entirety of the lower backsheet 4, the lower mold, the polyester fiber sheet and the upper mold to the drying box for drying and forming, after drying in the drying box, removing the upper mold and the lower mold to form the polishing disc.

The effect of the present disclosure is that the upper backsheet 1 and the lower backsheet 4 have the same contour as the lower the lower die, so that the polishing disc formed in the later stage is more symmetrical in appearance, the vibrator can realize uniform mixing of polishing powder and polyester synthetic resin containing HC8968 and HC8552, so that the density of the formed soft polishing layer 3 is more uniform, and the surface of the mixed raw material is scraped flat to make the surface of the soft polishing layer 3 smoother. The design of the present disclosure enables stable processing of the environmentally friendly soft polishing layer 3.

In some embodiments of the disclosure, the lower mold comprises a circular ring member and a disc, a diameter of the disc is smaller than an inner diameter of the circular ring member, the disc is located in a middle of the circular ring member, and the upper mold is a circular plate.

In the above embodiment, the circular ring member of the lower mold is placed on the lower backsheet 4 so that the circular ring member and the lower backsheet 4 are neatly overlapped, a disc is placed on the inner side of the circular ring member, the thickness of the disc and the circular ring member is the same, a polishing powder and a mixture of polyester synthetic resin containing HC8968 and HC8552 are injected between the disc and the circular ring member, and the circular plate is covered on the circular ring member. A hole is formed in the middle of the original plate, and the diameter of the hole is not larger than the diameter of the disc. When the circular plate is closed on the circular ring, a vibrator is placed on the original plate so that the mixture of polishing powder and polyester synthetic resin containing HC8968 and HC8552 is evenly distributed in the lower mold.

The lower backsheet 4 and the circular ring member and the upper backsheet 1 and the circular ring member are connected by bolts, and the circular plate and the circular ring member are connected by bolts. The bolt connection method has the advantages of quick installation or disassembly. It is more efficient in the molding step of polishing the optical disc.

In some embodiments of the disclosure, the lower backsheet 4, the lower mold, the polyester fiber sheet and the upper mold are integrally composed of three sequential drying steps in a drying oven, wherein temperatures of the three drying steps are 45° C., 92° C. and 60° C. respectively, and times of the three drying steps are 230 minutes, 230 minutes and 450 minutes respectively.

In the above embodiment, the drying box includes three steps. The first step is that the drying box uses a temperature of 45° C. centigrade and a drying time of 230 minutes to dry the lower backsheet 4, the lower mold, the polyester fiber sheet and the upper mold, and then uses a temperature of 92° C. centigrade and a drying time of 230 minutes to dry the lower backsheet 4, the lower mold, the polyester fiber sheet and the upper mold, and finally uses a temperature of 60° C. centigrade and a drying time of 450 minutes to dry the lower backsheet 4, the lower mold, the polyester fiber sheet and the upper mold. The three steps of the above drying box are automatic adjustment control, avoiding the problems of low drying efficiency and inaccurate time control during manual operation.

The above is only a preferred embodiment of the present disclosure and is not intended to limit the present disclosure, which may be varied and varied for those skilled in the art. Any modification, equivalent replacement, improvement, etc. made within the spirit and principles of the disclosure shall be covered by the protection of the disclosure.

What is claimed is:

1. An environment-friendly polishing disc, comprising a lower backsheet, a soft polishing layer on an upper side of the lower backsheet, and the soft polishing layer is a polyurethane synthetic resin containing polishing powder, and an upper backsheet is provided on an upper side of the soft polishing layer, wherein the polishing powder is embedded within the soft polishing layer, the upper backsheet and the lower backsheet are integrally dried and formed.

2. The environment-friendly polishing disc according to claim 1, wherein: the lower backsheet is a paste.

3. The environment-friendly polishing disc according to claim 1, wherein: the upper backsheet is a polyester sheet.

4. The environment-friendly polishing disc according to claim 1, wherein: the polyurethane synthetic resin comprises a polymer prepolymer and a castable polyurethane prepolymer, wherein the polymer prepolymer includes a material commercially identified as HC8968 and the castable polyurethane prepolymer includes a material commercially identified as HC8552.

5. The environment-friendly polishing disc according to claim 1, wherein: the composition of the polishing powder comprises at least one of the following:

cerium oxide, aluminum oxide, silicon oxide, iron oxide, zirconium oxide, or chromium oxide.

6. The environment-friendly polishing disc according to claim 1, wherein: the lower backsheet, the soft polishing layer and the upper backsheet are all circular, and the diameters of the lower backsheet, the soft polishing layer and the upper backsheet are all same.

7. The environment-friendly polishing disc according to claim 6, wherein: a hole is provided in a middle of the soft polishing layer, and an upper side of the hole and a lower side of the hole penetrate an upper side of the upper backsheet and a lower side of the lower backsheet, respectively.

* * * * *